Patented Oct. 7, 1924.

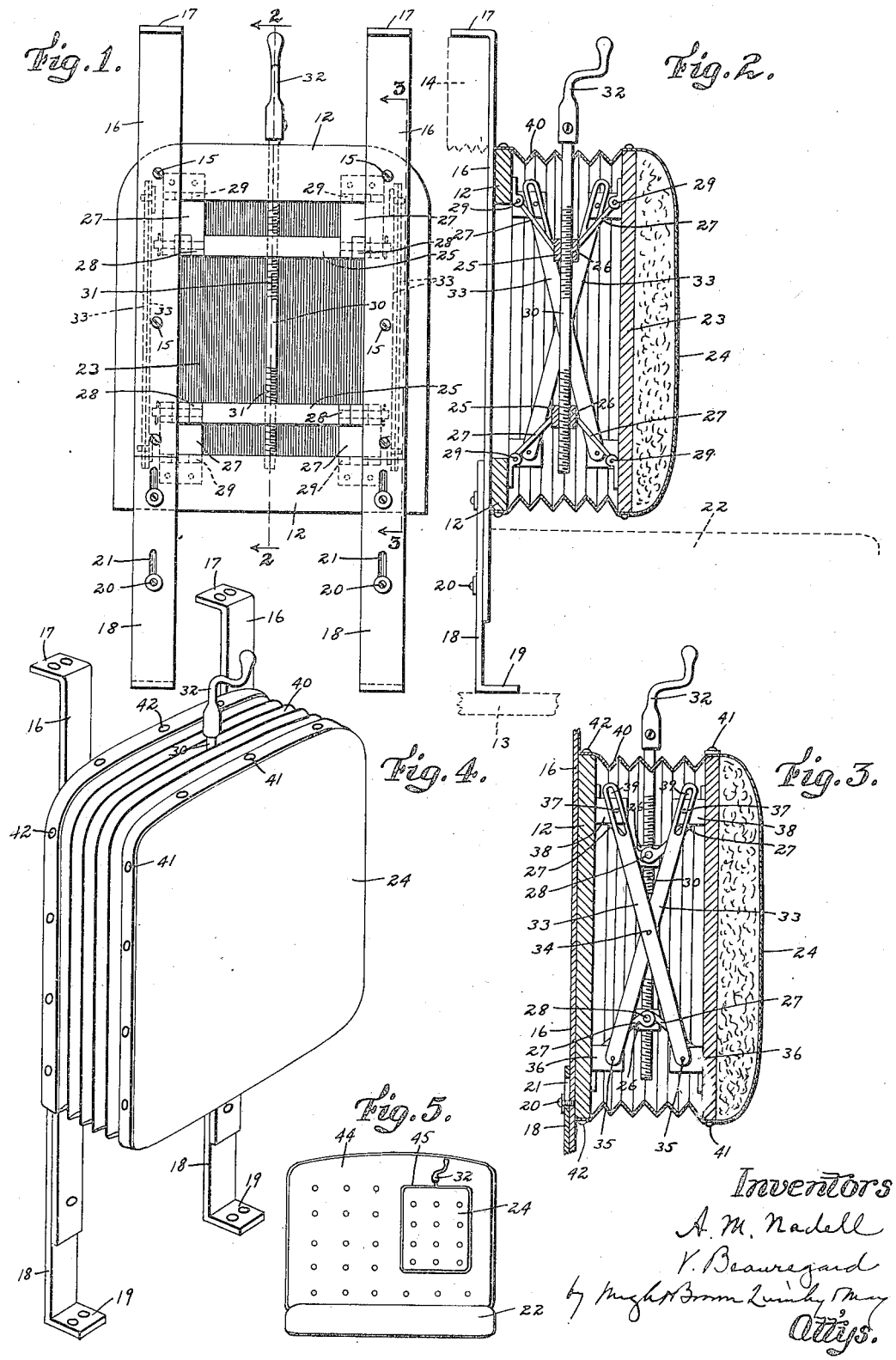

1,510,858

UNITED STATES PATENT OFFICE.

ABRAHAM M. NADELL AND VICTOR BEAUREGARD, OF BOSTON, MASSACHUSETTS; SAID BEAUREGARD ASSIGNOR OF ONE-HALF OF HIS RIGHT TO SAID NADELL.

ADJUSTABLE SEAT BACK.

Application filed February 23, 1923. Serial No. 620,643.

*To all whom it may concern:*

Be it known that we, ABRAHAM M. NADELL and VICTOR BEAUREGARD, citizens of the United States, residing at Boston, in the county of Suffolk and State of Massachusetts, have invented new and useful Improvements in Adjustable Seat Backs, of which the following is a specification.

This invention relates chiefly to the seats of automobiles, and has for its principal object to provide an adjustable back, adapted to be projected to any desired extent toward the forward edge of the usual seat, and firmly supported at any desired projection and prevented from tipping, so that the operator's back may be adequately supported at various distances from the front edge of the seat, one useful result of the adjustable back being, that a driver who is shorter than the average stature, is enabled to conveniently reach the various levers in front of the seat.

Other objects and useful results of the invention will appear as the description proceeds, said objects being accomplished by the improvements hereinafter described and claimed.

Of the accompanying drawings forming a part of this specification,—

Figure 1 is a rear elevation of a structure embodying the invention, organized as an attachment applicable to the seat structure of an existing vehicle.

Figure 2 is a section on line 2—2 of Figure 1.

Figure 3 is a section on line 3—3 of Figure 1.

Figure 4 is a perspective view of the attachment.

Figure 5 is a front elevation, on a smaller scale, showing the back and seat of a vehicle having an adjustable back, embodying the invention, built into the main back.

The same reference characters indicate the same parts in all the figures.

We will first describe the embodiment of the invention shown by Figures 1, 2, 3 and 4. 12 represents a holder adapted to be attached to portions 13 and 14 of a fixed seat structure. The holder 12 is preferably a substantially rectangular wooden frame, as shown by Figure 1. To attach the holder to the seat structure, we may provide metal straps attached as by screws 15, to the holder, and projecting above and below the latter. In this instance each strap is composed of an elongated upper section 16, having an ear 17, and a lower section 18, having an ear 19, the sections being connected by screws 20, passing through slots 21. Provision is thus made for varying the height of the holder 12, and of the adjustable back hereinafter described, above the usual seat 22, as may be found desirable by the occupant.

The adjustable back may be of any suitable construction. As here shown, it includes a back board 23, and a cushion 24, covering the front side of the board.

The adjustable back is connected with the holder 12 by parallel motion mechanism, adapted to cause a rectilinear movement of the back toward and from the holder, and maintain it substantially parallel with said holder. We prefer to organize said mechanism as next described.

25, 25 represent parallel metal bars, provided with tapped orifices 26 (Figure 2). One of said orifices has a right hand thread, and the other a left hand thread. Toggle links 27 are hinged at 28 to opposite ends of the bars 25, and at 29, to the portion 23 of the adjustable back, and to the holder 12. 30 represents a shaft having right and left threaded portions 31, engaged with the tapped sockets of the parallel bars 25, one end of the shaft being provided with a crank or handle 32. Rotation of the shaft causes simultaneous movement of the parallel bars in opposite directions, and thus swings the toggle links 27, to cause movement of the back toward or from the holder 12, as the case may be.

To brace the back so that its upright edge portions are equally supported and prevented from yielding, we provide bracing means, preferably embodied in two pairs of crossed levers 33, connected at their central portions by a pivot 34. Given extremities of said levers (the lower extremities in this instance) are pivoted at 35 to ears 36, fixed to the portion 23 of the back and to the holder 12. The opposite extremities of the levers are slidably connected with the back and with the holder 12, by studs 37, on ears 38, fixed to the back and to the holder 12, said studs entering slots 39, formed in the levers.

The back is maintained parallel with the holder 12 by the conjoint action of the parallel motion mechanism and the bracing means.

To exclude moisture, dust and dirt from the space between the adjustable back and the holder 12, we provide a flexible casing 40, composed of waterproof fabric, or other suitable material, and disposed in bellows-like folds, as shown by Figures 2, 3 and 4. One end of the casing is attached as by fasteners 41 to the portion 23 of the back, and the opposite end is attached as by fastenings 42, to the holder 12. The casing forms a wall surrounding the parallel motion mechanism, and its bellows folds permit it to be extended and contracted in conformity to the movements of the adjustable back.

The shaft 30 passes through an orifice in the upper portion of the casing 40, as shown by Figure 2. The construction of the casing is such that it may be elongated and contracted, to correspond to all adjustments of the back.

Figures 2, 3 and 4 show the adjustable back about midway between the extremes of its movement. When the back is fully retracted, it may be nearly in contact with the holder 12.

In installing this embodiment of the invention, a portion of the usual upholstery of a fixed seat back may be removed, to expose the portions 13 and 14 of the seat structure, and the straps 17—18 may then be attached by screws to said portions. The upholstery of the fixed back 44, may be provided with an opening 45, as shown by Figure 5, when the adjustable back is to be applied to a car under process of construction. In this case the holder is a part of the fixed back 14.

As implied in the foregoing description, and in the following claims, we are not limited to the specific mechanism shown by the drawings, except as otherwise required in certain of the more limited claims.

We claim:

1. The combination with a vehicle seat and a fixed back pertaining thereto, of a movable back located forward of the fixed back; horizontally extensible and contractible parallel motion mechanism interposed between and connected with the two backs; means for extending and contracting said mechanism to horizontally adjust the movable back; and bracing means connected with said mechanism and horizontally extensible and contractible thereby, said bracing means being organized to cooperate with the said mechanism in maintaining the movable back substantially parallel with the fixed back, and in positively supporting the movable back in any position to which it may be adjusted.

2. In combination, a movable seat back; fixed supporting means including a holder; parallel motion mechanism including two parallel bars, provided with tapped orifices, one having a right, and the other a left thread, toggle links hinged to said bars and to the said back and holder, and an operating shaft having right and left threads engaged with said orifices, the arrangement being such that the rotation of said shaft moves said bars simultaneously in opposite directions, and imparts movement to the back through the bars and the toggle links, and adjustable bracing means including two pairs of crossed levers, pivotally connected at their central portions, pivotal connections between extremities of said levers and the said back and holder, and sliding connections between other extremities of the levers and the back and holder.

3. In combination, a movable seat back, a holder having elongated straps projecting above and below the holder and provided with ears attachable to portions of a seat structure, said straps including upper sections attached to the holder, and lower sections adjustably secured to the upper sections, to vary the height of the holder; and parallel motion mechanism connecting the back with said holder, and including an operating member, whereby said mechanism may be actuated to move the back.

In testimony whereof we have affixed our signatures.

ABRAHAM M. NADELL.
VICTOR BEAUREGARD